United States Patent
Won et al.

(10) Patent No.: US 9,609,764 B2
(45) Date of Patent: Mar. 28, 2017

(54) IMAGE DISPLAY APPARATUS

(71) Applicant: Samsung Display Co., LTD., Yongin, Gyeonggi-Do (KR)

(72) Inventors: Byeong-Hee Won, Hwaseong-si (KR); Yi joon Ahn, Seoul (KR); IlNam Kim, Hwaseong-si (KR); WonSang Park, Yongin-si (KR)

(73) Assignee: Samsung Display Co., Ltd., Samsung-ro, Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 14/702,113

(22) Filed: May 1, 2015

(65) Prior Publication Data
US 2016/0192511 A1 Jun. 30, 2016

(30) Foreign Application Priority Data

Dec. 26, 2014 (KR) .......................... 10-2014-0190581

(51) Int. Cl.
- *H04R 1/02* (2006.01)
- *H05K 5/00* (2006.01)
- *G02F 1/00* (2006.01)
- *H04R 19/02* (2006.01)
- *H04R 19/04* (2006.01)
- *H04R 29/00* (2006.01)
- *H04N 5/64* (2006.01)

(52) U.S. Cl.
CPC ............. *H05K 5/0017* (2013.01); *G02F 1/00* (2013.01); *H04R 19/02* (2013.01); *H04R 19/04* (2013.01); *H04R 29/00* (2013.01); *H04N 5/642* (2013.01); *H04R 2460/07* (2013.01); *H04R 2499/15* (2013.01)

(58) Field of Classification Search
CPC ........ H05K 5/0017; G02F 1/00; H04R 19/02; H04R 19/04; H04R 29/00; H04R 2460/07; H04R 2499/15; H04R 5/02; H04N 5/642
See application file for complete search history.

(56) References Cited

U.S. PATENT DOCUMENTS

| 8,184,833 | B2 | 5/2012 | Demuynck |
| 8,461,630 | B2 * | 6/2013 | Endo ................... H01L 27/1288 257/217 |
| 2006/0166698 | A1 * | 7/2006 | Saiki ...................... H04M 1/03 455/550.1 |

(Continued)

FOREIGN PATENT DOCUMENTS

| JP | 2009522899 A | 6/2009 |
| JP | 2010028784 A | 2/2010 |

(Continued)

*Primary Examiner* — Andrew L Sniezek
(74) *Attorney, Agent, or Firm* — Robert E. Bushnell, Esq.

(57) ABSTRACT

Provided is an image display apparatus. The image display apparatus includes a display panel displaying an image through a display area, a plurality of acoustic devices disposed on a non-display area around the display area, a protection member accommodating the display panel and the acoustic devices, and a plurality of opening parts defined to corresponding to the acoustic devices, the plurality of opening parts being defined by opening the protection member of the non-display area in both directions perpendicular to a plane.

20 Claims, 7 Drawing Sheets

(56) References Cited

U.S. PATENT DOCUMENTS

| | | | |
|---|---|---|---|
| 2014/0278385 A1* | 9/2014 | Fan | G02C 11/10 |
| | | | 704/226 |
| 2015/0049899 A1* | 2/2015 | Mellow | G06F 1/1605 |
| | | | 381/388 |

FOREIGN PATENT DOCUMENTS

| | | |
|---|---|---|
| JP | 2012503936 A | 2/2012 |
| KR | 1020100108363 A | 10/2010 |
| KR | 1020110051644 A | 5/2011 |
| KR | 1020130041086 A | 4/2013 |
| KR | 1020130041101 A | 4/2013 |

\* cited by examiner

IMAGE DISPLAY APPARATUS

CLAIM OF PRIORITY

This U.S. non-provisional patent application claims the priority of all the benefit accruing under 35 U.S.C. §119 of Korean Patent Application No. 10-2014-0190581, filed on Dec. 26, 2014 in the Korean Intellectual Property Office (KIPO), the entire contents of which are hereby incorporated by reference.

BACKGROUND OF THE INVENTION

Field of the Invention

The present disclosure herein relates to an image display apparatus, and more particularly, to an image display apparatus that is capable of improving user's convenience.

Description of the Related Art

Electronic equipment for providing an image to a user such as smartphones, digital cameras, laptop computers, navigations, smart televisions, and the like includes an image display apparatus for displaying an image. The image display apparatus include a display panel for generating an image to display the generated image and a window layer disposed above the display panel to protect the display panel.

Various display panels such as liquid crystal display panels, organic light emitting display panels, electro wetting display panels, and electrophoretic display panels are being developed as the display panel. The image generated in the display panel may pass through the window layer and then be provided to the user.

When listening to music or making a call through the image display apparatus, other's voice may be outputted through a speaker. The speaker outputs the voice in any one direction. Also, in general, the speaker is disposed on an upper portion of the image display apparatus, and a microphone is disposed on a lower portion of the image display apparatus.

SUMMARY OF THE INVENTION

The present disclosure provides an image display apparatus that is capable of improving user's convenience.

Embodiments of the inventive concept provide image display apparatuses including: a display panel displaying an image through a display area; a plurality of acoustic devices disposed on a non-display area around the display area; a protection member accommodating the display panel and the acoustic devices; and a plurality of opening parts defined to corresponding to the acoustic devices, the plurality of opening parts being defined by opening the protection member of the non-display area in both directions perpendicular to a plane.

In some embodiments, the acoustic devices may be disposed on the display panel of the non-display area.

In other embodiments, wherein the acoustic devices may be disposed on the display panel of first and second non-display areas, which are adjacent to both facing side surfaces of the display area, of the non-display area.

In still other embodiments, the protection member may include: a first protection member including a bottom part and a side surface part extending upward from a boundary of the bottom part, the first protection member accommodating the display panel and the acoustic devices; and a second protection member disposed on the first protection member to cover the display panel and the acoustic devices.

In even other embodiments, the image display apparatuses may further include: an encapsulation layer disposed on the display panel; and a polarization layer disposed on the encapsulation layer, wherein the encapsulation layer and the polarization layer may be accommodated in the first and second protection members, and the acoustic devices may be disposed between the encapsulation layer and the side surface part and between the polarization layer and the side surface part.

In yet other embodiments, each of the opening parts may include: a first opening part defined in a predetermined area of the bottom part adjacent to the side surface part; and a second opening part defined in a predetermined area of the second protection member adjacent to the side surface part.

In further embodiments, each of the acoustic devices may have an area greater than that of each of the opening parts, and a predetermined area of each of the acoustic devices may overlap a corresponding opening part of the opening parts.

In still further embodiments, each of the acoustic devices may include: a first electrode disposed on the display panel on the first and second non-display areas; a second electrode disposed to face the first electrode; a vibrator disposed between the first electrode and the second electrode, the vibrator having flexibility; and spacers disposed between the first electrode and the vibrator and between the second electrode and the vibrator.

In even further embodiments, the vibrator may include: a film having flexibility; and a conductive layer disposed on each of both surfaces of the film.

In yet further embodiments, each of the spacers may be formed of an insulation material and have flexibility.

In much further embodiments, each of the first and second electrodes and the vibrator may have an area greater than that of the corresponding opening part of the opening parts, and predetermined areas of the first and second electrodes adjacent to the side surface part and the vibrator may overlap the corresponding opening part.

In still much further embodiments, the display panel may include a plurality of holes perpendicularly passing through the display panel on a predetermined area of the display panel, which is adjacent to the side surface part and overlaps the opening parts.

In even much further embodiments, the first electrode may include a plurality of first holes perpendicularly passing through the first electrode on a predetermined area of the first electrode overlapping a corresponding opening part of the opening parts, and the second electrode may include a plurality of second holes perpendicularly passing through the second electrode on a predetermined area of the second electrode overlapping the corresponding opening part.

In yet much further embodiments, the holes, the first holes, and the second holes may overlap each other on the opening parts.

In much still further embodiments, the image display apparatuses may further include: a gravity sensor determining a position of each of the acoustic devices; an operational amplifier; an acoustic signal transmission part outputting voltages corresponding to an acoustic signal through an output terminal; a first selection part selectively connecting the output terminal of the acoustic signal transmission part and an input terminal of the operational amplifier to the first electrode in response to a control signal generated according to positions of the acoustic devices, which are determined by the gravity sensor; and a second selection part selectively connecting the output terminal of the acoustic signal transmission part and a ground terminal to the second electrode in response to the control signal, wherein a bias voltage may be applied to the vibrator, and voltages having polarities different from each other may be respectively applied to the first and second electrodes.

In even still further embodiments, the acoustic devices, which are closer to the ground, of the acoustic devices may be driven as a microphone, and the acoustic devices, which are away from the ground, of the acoustic devices may be driven as a speaker, when the acoustic devices are driven as the speaker, the first and second selection parts may provide the voltages applied from the acoustic signal transmission part to the first and second electrodes in response to the control signal, and when the acoustic device are driven as the microphone, the first and second selection parts may connect the first electrode to the input terminal of the operational amplifier and connect the second electrode to the ground terminal in response to the control signal.

In yet still further embodiments, the display panel may extend to be adjacent to the opening parts, the first and second electrodes may be disposed adjacent to the opening parts, and a predetermined area of the vibrator adjacent to the side surface part may overlap each of the opening parts.

In much even further embodiments, the acoustic devices may be disposed under the display panel on the first and second non-display areas, which are adjacent to both facing side surfaces of the display area, of the non-display area.

In still even further embodiments, the image display apparatuses may further include a case accommodating the acoustic device, wherein the acoustic devices may be disposed between a side surface of the display panel and an outer boundary of the protection member.

In yet even further embodiments, the case may include a plurality of third and fourth holes defined in a predetermined area of the case, which is adjacent to the outer boundary of the protection member.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
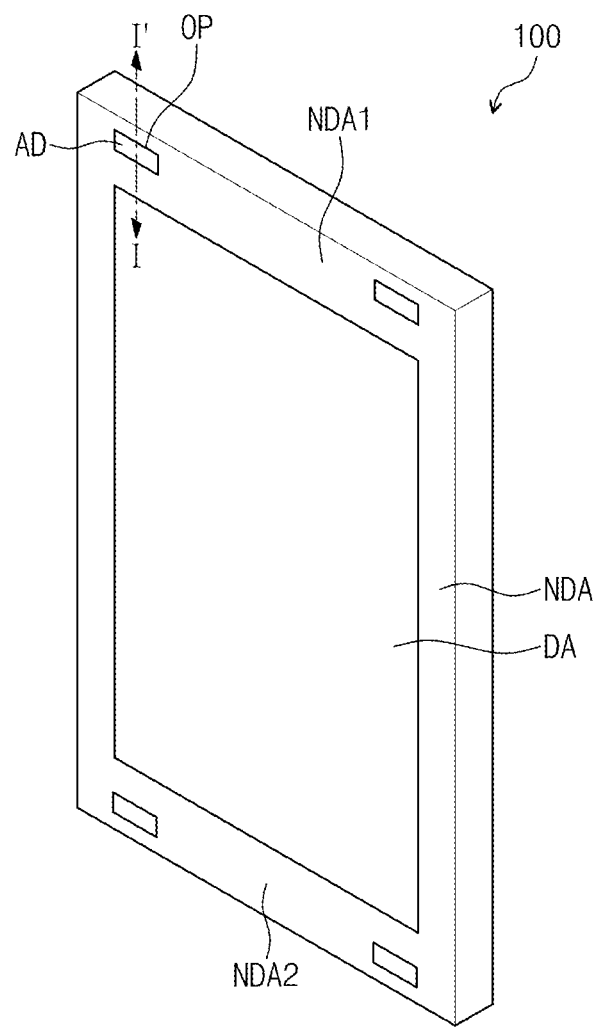
FIG. 1 is a plan view of an image display apparatus according to an embodiment of the inventive concept.
Figure 1:
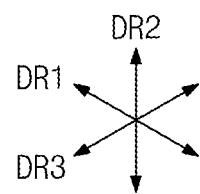

Advantages and features of the inventive concept, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the inventive concept to those skilled in the art. Further, the present disclosure is only defined by scopes of claims. Like reference numerals refer to like elements throughout.

It will also be understood that when a layer is referred to as being "on" another layer or substrate, it can be directly on the other layer or substrate, or intervening layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper" and the like, may be used herein for ease of description to describe one element or feature's relationship to another element(s) or feature(s) as illustrated in the figures. The spatially relative terms should be understood as terms which include different directions of configurative elements in addition to directions illustrated in the figures when using or operating the inventive concept. Like reference numerals refer to like elements throughout.

It will be understood that although the terms of first and second are used herein to describe various elements, these elements should not be limited by these terms. These terms are only used to distinguish one component from another component. Accordingly, a first component that will be described below may be a second component within the technical idea of the inventive concept.

The embodiment in the detailed description will be described with schematic cross-sectional views and/or plan views as ideal exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate a specific shape of a semiconductor package region. Thus, this should not be construed as limited to the scope of the inventive concept.

Hereinafter, exemplary embodiments of the inventive concept will be described below in more detail with reference to the accompanying drawings.

FIG. 1 is a plan view of an image display apparatus according to an embodiment of the inventive concept.

Referring to FIG. 1, an image display apparatus 100 may have a short side in a first direction DR1 and a long side in a second direction DR2 crossing the first direction DR1.

The image display apparatus 100 has a display area DA and a non-display area NDA around the display area DA on a plane. The display area DA may be defined as an area on which an image to be provided to a user is displayed. The non-display area NDA may be defined as an area on which an image is not displayed.

The non-display area NDA includes a first non-display area NDA1 adjacent to an upper portion of the display area DA and a second non-display area NDA2 adjacent to a lower portion of the display area DA in the second direction DR2.

The first non-display area NDA1 is a region bounded by a horizontal line contacting the parallel top edge of the display area DA and extending beyond the image display apparatus 100, and a horizontal line contacting the top edge of the image display apparatus 100. The second non-display area NDA2 is a region bounded by a horizontal line contacting the parallel bottom edge of the display area DA and extending beyond the image display apparatus 100, and a horizontal line contacting the bottom edge of the image display apparatus 100.

The image display apparatus 100 includes a plurality of acoustic devices AD and a plurality of opening parts OP that are disposed to one-to-one correspond to the acoustic devices AD. The acoustic devices AD may be disposed on the non-display areas NDA adjacent to both facing side surfaces of the display area DA. For example, as illustrated in FIG. 1, the acoustic devices AD may be disposed on the first and second non-display areas NDA1 and NDA2 adjacent to both sides of the display area DA in the second direction DR2.

However, the present disclosure is not limited thereto. For example, the acoustic devices AD may be disposed on the non-display area NDA adjacent to left and right sides of the display area DA in addition to the first and second non-display areas NDA1 and NDA2.

According to an exemplary embodiment, two acoustic devices AD may be disposed on each of the first and second non-display areas NDA1 and NDA2. However, the present disclosure is not limited thereto. For example, one acoustic device AD or two or more acoustic devices AD may be disposed on each of the first and second non-display areas NDA1 and NDA2.

A speaker for providing other's voice when making a call or music to the user may be used as the acoustic devices AD. Also, a microphone for transmitting user's voice when making a call may be used as the acoustic devices AD.

For example, the image display apparatus 100 includes a gravity sensor (not shown). The gravity sensor detects a direction of the gravity. Thus, the acoustic devices AD that are closer to the ground and the acoustic devices AD that are away from the ground may be classified by the gravity sensor.

In general, the user hears other's voice through a speaker disposed on an upper portion of a mobile phone and provides user's voice to the other party through a microphone disposed on a lower portion of the mobile phone. Thus, the acoustic devices AD that are closer to the ground may be used as the microphone, and the acoustic devices AD that are away from the ground may be used as the speaker.

Particularly, the acoustic devices AD disposed on the second non-display area NDA2 may be disposed closer to the ground than the acoustic device AD disposed on the first non-display area NDA1. In this case, the acoustic devices AD disposed on the first non-display area NDA1 may be used as the speaker, and the acoustic devices AD disposed on the second non-display area NDA2 may be used as the microphone.

Thus, when making a call, the user may hear the other's voice through the acoustic devices AD that are used as the speaker and disposed on the first non-display area NDA1, and the user's voice may be transmitted to the other party through the acoustic devices AD that are used as the microphone and disposed on the second non-display area NDA2. Also, the user may hear music through the acoustic devices AD that are used as the speaker and disposed on the first non-display area NDA1.

On the other hand, if the image display apparatus 100 is turned inside out, the acoustic devices AD disposed on the first non-display area NDA1 may be disposed closer to the ground than the acoustic devices AD disposed on the second non-display area NDA2. In this case, the acoustic devices AD disposed on the first non-display area NDA1 may be used as the speaker, and the acoustic devices AD disposed on the second non-display area NDA2 may be used as the microphone.

According to the above-described operation, even though the image display device 100 is turned inside out in the second direction DR2, normal call may be enabled.

Hereinafter, a plane of the image display apparatus 100 of FIG. 1 may be defined as a front surface, and an surface opposite to the front surface of the image display apparatus 100 may be defined as a rear surface. The opening parts OP may be defined in the front surface of the image display apparatus 100. Although the opening parts OP are defined in only the front surface of the image display apparatus 100 in FIG. 1, the present disclosure is not limited thereto. Substantially, the opening parts OP may be defined in the rear surface of the image display apparatus 100.

The sound of the acoustic devices AD or the user's voice may be inputted or outputted in both directions through the opening parts OP in a third direction DR3 crossing the first and second directions DR1 and DR2. The third direction DR3 may be a direction perpendicular to the plane defined by the first and second directions DR1 and DR2 and defined as a direction including upward or downward directions.

Thus, the user may make a call or hear music through the front and rear surfaces of the image display device 100. Hereinafter, the above-described constitutions will be described in detail.

Figure 2:
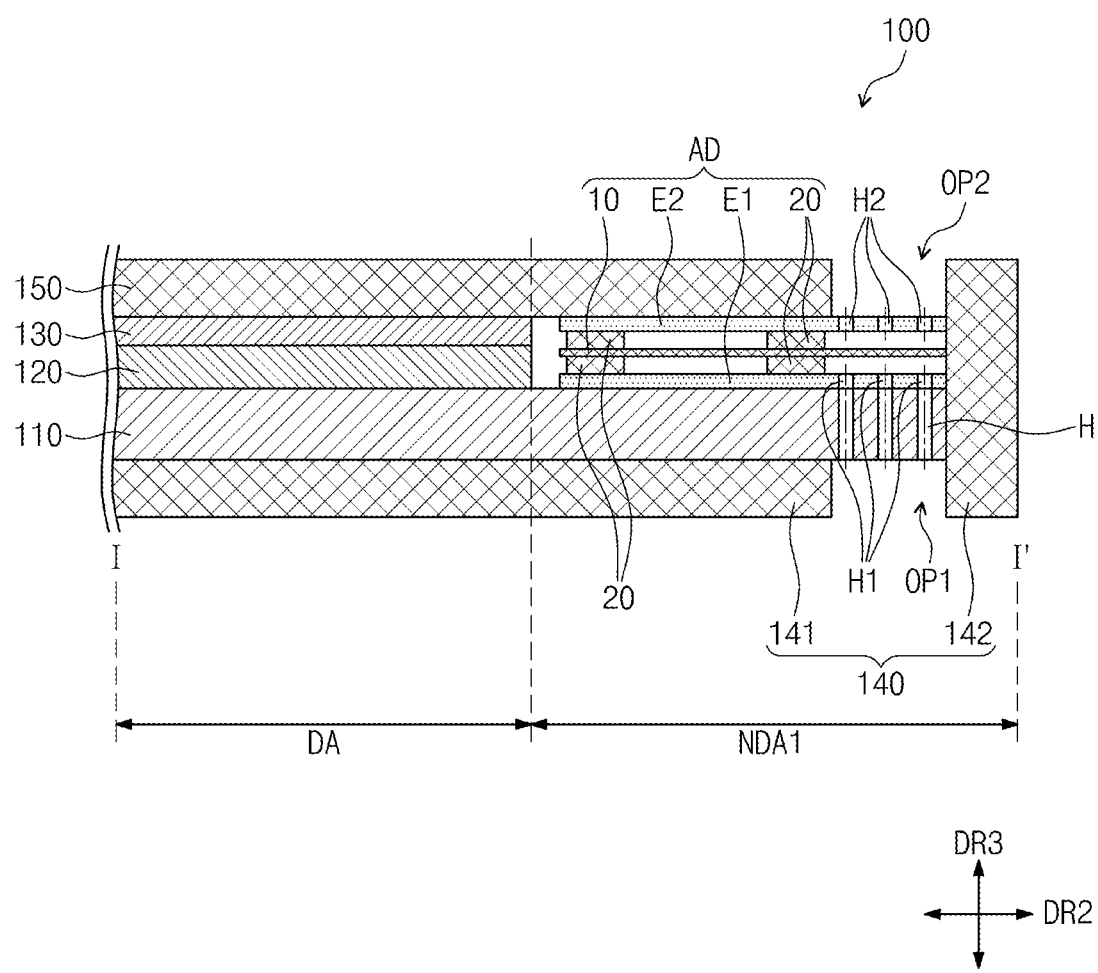
FIG. 2 is a cross-sectional view taken along line I-I' of FIG. 1.

FIG. 2 is a cross-sectional view taken along line I-I' of FIG. 1.

For convenience of description, FIG. 2 illustrates a cross-section of one acoustic device AD and an opening part OP corresponding to the acoustic device AD of FIG. 2 among the opening parts OP. However, substantially, each of other opening parts OP and acoustic devices AD may have the same constitution as the acoustic device AD and opening part OP of FIG. 2. Thus, the acoustic device AD and opening part OP of FIG. 2 will be described below as an example.

Referring to FIG. 2, the image display apparatus 100 includes a display panel 110, an encapsulation layer 120, a polarization layer 130, protection members 140 and 150, and an acoustic device AD. The display panel 110, the encapsulation layer 120, the polarization layer 130, and the acoustic device AD are accommodated in the first and second protection members 140 and 150.

The display panel 110 disposed on the display area DA includes pixels (not shown) for generating an image. The display panel 110 disposed on the non-display area NDA may include a driving unit (not shown) for driving the pixels and the acoustic devices AD. According to an exemplary embodiment, the display panel 110 may be an organic light emitting display panel including organic light emitting devices as the pixels.

However, the present disclosure is not limited thereto. For example, various display panels such as a liquid crystal display panel, an electro wetting display panel, and an electrophoretic display panel may be used as the display panel 110.

The encapsulation layer 120 seals the pixels disposed on the display panel 110. The polarization layer 130 is disposed on the encapsulation layer 120. The polarization layer 130 may improve linearity of light emitted from the display panel 110 to prevent the light from being scattered or interfering, thereby improving a color sense.

The polarization layer 130 may selectively transmit external light. Thus, the polarization layer 130 may prevent the external light from being reflected to improve image visibility of the image display apparatus 100.

The acoustic device AD is disposed on the display panel 110 on the first non-display area NDA1. Also, although not shown on a cross-section of FIG. 2, the acoustic devices AD may be disposed on the display panel 110 on the second non-display area NDA2.

The acoustic device AD includes a first electrode E1, a second electrode E2, a vibrator 10, and spacers 20. The first and second electrodes E1 and E2 having conductivity are disposed to face each other. The first electrode E1 may be disposed on the display panel 110 on the first non-display area NDA1.

The vibrator 10 is disposed between the first electrode E1 and the second electrode E2. The vibrator 10 has flexibility. The vibrator 10 may be a diaphragm. The vibrator 10 includes a film having flexibility and a conductive layer disposed on each of both surfaces of the film.

The film may be formed of polyethylene terephthalate (PET) or polypropylene (PP) and have flexibility. The conductive layer may be formed by depositing a conductive metal or applying conductive paint on both surfaces of the film.

The spacers 20 are disposed between the vibrator 10 and the first electrode E1 and between the vibrator 10 and the second electrode E2. Each of the spacers is formed of an insulation material. The spacer 20 may have flexibility. Although shown as a cross-section in FIG. 2, the spacers 20 may have a rectangular frame shape on a plane.

The protection member includes a first protection member 140 for accommodating the display panel 110, the encapsulation layer 120, the polarization layer 130, and the acoustic device AD and a second protection member 150 disposed above the first protection member 140 to cover the display panel 110, the encapsulation layer 120, the polarization layer 130, and the acoustic device AD.

The first protection member 140 includes a bottom part 141 that is the rear surface of the image display apparatus 100 and a side surface part 142 extending from a boundary of the bottom part 141 in the third direction DR3 to form an outer boundary of the first and second protection members 140 and 150. That is, the side surface part 142 may substantially form a boundary of the image display apparatus 100 in the first and second directions DR1 and DR2.

The display panel 110 is disposed on the bottom part 141, and the encapsulation layer 120 and the polarization layer 130 are disposed on the display panel 110. The acoustic device AD is disposed between the encapsulation layer 120 and the side surface part 142 and between the polarization layer 130 and the side surface part 142. The first protection member 140 is called a case member.

The second protection member 150 is disposed on a front surface of the image display apparatus 100. The second protection member 150 is called a window member. The image generated in the display panel 110 may pass through the second protection member 150 of the display area DA and then provided to the user.

The opening part OP includes a first opening part OP1 disposed on a 20 predetermined area of the bottom part 141 adjacent to the side surface part 142 and a second opening part OP2 disposed on a predetermined area of the second protection member 150 adjacent to the side surface part 142 in the second direction DR2.

That is, the first opening parts OP1 are defined in the first and second non-display areas NDA1 and NDA2 of the rear surface of the image display apparatus 100. The second opening parts OP2 are defined in the first and second non-display areas NDA1 and NDA2 of the front surface of the image display apparatus 100.

The first and second opening parts OP1 and OP2 may be formed by removing the predetermined area of the bottom part 141 adjacent to the side surface part 142 and the predetermined area of the second protection member 150 adjacent to the side surface part 142. Thus, the first and second opening parts OP1 and OP2 are opened in the third direction DR3 perpendicular to the plane.

A predetermined area of the display panel 110 adjacent to the side surface part 142 may be disposed to overlap the first and second opening parts OP1 and OP2. The display panel 110 includes a plurality of holes H passing through the display panel 110 in the third direction DR3 on an area of the display panel 110 overlapping the first and second opening parts OP1 and OP2.

The acoustic device AD on a plane defined by the first and second directions DR1 and DR2 may have an area greater than that of each of the first and second opening parts OP1 and OP2. A predetermined area of the acoustic device AD in the second direction may be disposed to overlap the first and second opening parts OP1 and OP2 and thus be exposed by the first and second opening parts OP1 and OP2. Particularly, a predetermined area of the acoustic device AD adjacent to the side surface part 142 in the second direction DR2 may be disposed to overlap the first and second opening parts OP1 and OP2.

The vibrator 10 and the first and second electrodes E1 and E2 of the acoustic device AD may have an area greater than that of each of the first and second opening parts OP1 and OP2 on the plane defined by the first and second directions DR1 and DR2. Predetermined areas of the vibrator 10 and the first and second electrodes E1 and E2 which are adjacent to the side surface part 142 in the second direction DR2 may overlap the first and second opening parts OP1 and OP2.

The first electrode E1 includes a plurality of first holes H1 passing through the first electrode E1 in the third direction DR3 on a predetermined area of the first electrode E1 that overlaps the first and second opening parts OP1 and OP2. The first holes H1 is disposed to overlap the holes H of the display panel 110.

The second electrode E2 includes a plurality of second holes H2 passing through the second electrode E2 in the third direction DR3 on a predetermined area of the second electrode E2 that overlaps the first and second opening parts OP1 and OP2. The second holes H2 may be disposed to overlap the first holes H1.

Figure 3:
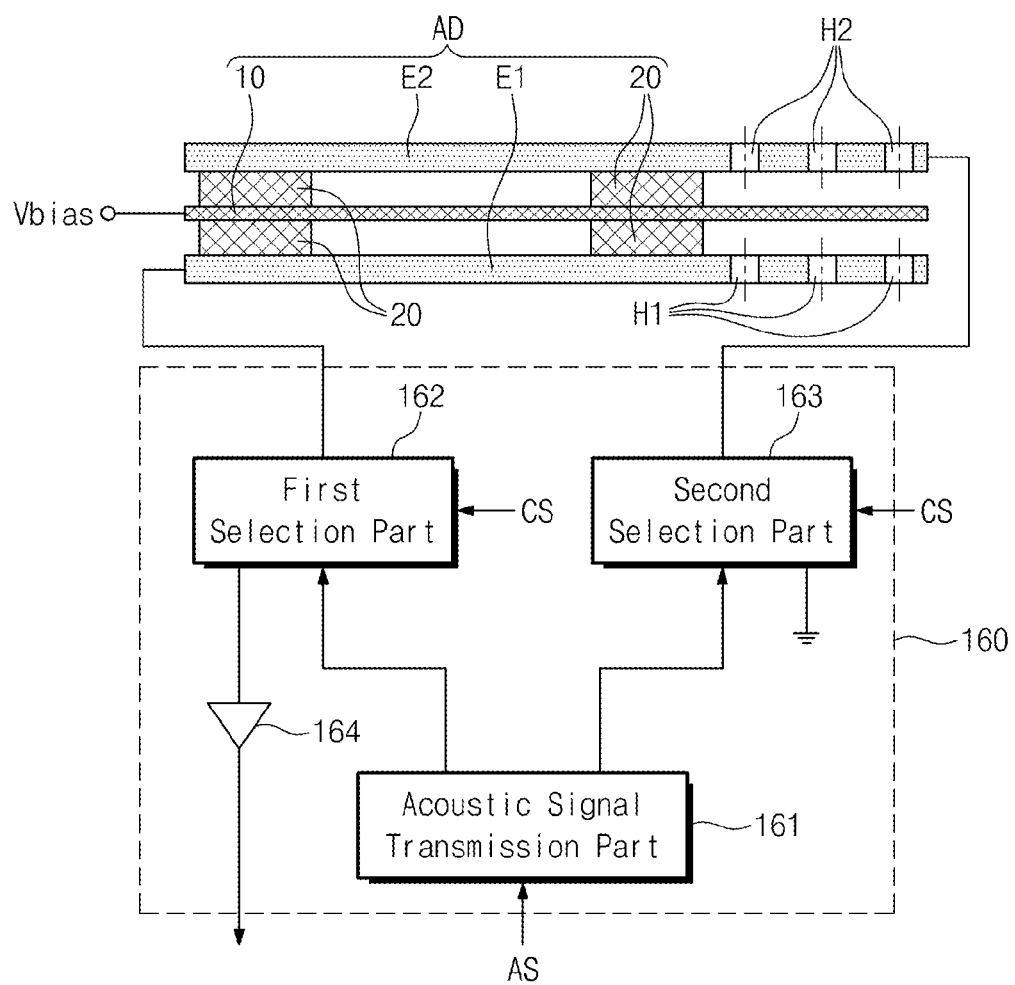
FIG. 3 is a schematic block diagram of a driving unit for driving an acoustic device of FIG. 2.

FIG. 3 is a schematic block diagram of a driving unit for driving an acoustic device of FIG. 2.

For convenience of description, one acoustic device AD is illustrated in FIG. 3. The acoustic devices AD that are not shown may also substantially perform the same operate as the acoustic device AD of FIG. 3.

Referring to FIG. 3, the driving unit 160 includes an acoustic signal transmission part 161, a first selection part 162, a second selection part 163, and an operational amplifier 164. Although not shown, the driving unit 160 may be disposed on the display panel 110 of the non-display area NDA.

The acoustic signal transmission part 161 receives an acoustic signal AS to output voltages corresponding to the acoustic signal AS to the first and second selection parts 162 and 163 through an output terminal. The acoustic signal AS transmitted to the acoustic signal transmission part 161 may be music or other's voice when making a call.

The first selection part 162 selectively connects the output terminal of the acoustic signal transmission part 161 and an input terminal of the operational amplifier 164 having relatively high input impedance to the first electrode E1 in response to a control signal CS generated according to positions of the acoustic devices AD.

The control signal CS is generated in a control part (not shown) according to a detection signal of the gravity sensor. For example, the control part determines a position of the acoustic device AD according to the detection signal of the gravity sensor and then outputs the control signal CS for driving the acoustic device AD as the speaker or microphone according to the determined position.

The second selection part 163 selectively connects the output terminal of the acoustic signal transmission part 161 and a ground terminal to the second electrode E2 in response to the control signal CS. A voltage applied to the first electrode E1 and a voltage applied to the second electrode E2 may have polarities opposite to each other.

When the acoustic device AD is driven as the speaker, the first and second selection parts 162 and 163 may provide the voltage transmitted from the acoustic signal transmission part 161 to the first and second electrodes E1 and E2.

A bias voltage Vbias is applied to the vibrator 10. A potential difference between the first and second electrodes E1 and E2 may occur by the voltage applied to the first electrode E1 and the voltage applied to the second electrode E2. An electrostatic force by which the vibrator 10 is closely pulled toward one of the first and second electrodes E1 and E2 may act on the vibrator 10 by the potential difference.

For example, a plus voltage may be applied to the first electrode E1, and a minus voltage may be applied to the second electrode E2. Since the plus voltage that is the bias voltage is applied to the vibrator 10, a repulsive force may be generated between the first electrode E1 to which the plus voltage is applied and the vibrator 10, and an attractive force may be generated between the second electrode E2 to which the minus voltage is applied and the vibrator 10. Thus, the vibrator 10 moves toward the second electrode E2.

On the other hand, when the plus voltage is applied to the second electrode E2, and the minus voltage is applied to the first electrode E1, the vibrator 10 moves toward the first electrode E1.

That is, since the vibrator 10 moves toward the first or second electrode E1 or E2 to vibrate, an acoustic wave due to the vibration may be generated from the vibrator 10. The acoustic wave is discharged through the first hole H1 of the first electrode E1 and the second hole H2 of the second electrode E2.

The acoustic wave discharged through the first hole H1 is discharged to the outside through the hole H of the display panel 100 and the first opening part OP1. The acoustic wave discharged through the second hole H2 is discharged to the outside through the second opening part OP2. That is, the acoustic wave generated in the vibrator 10 may be discharged to the front surface and rear surface of the image display apparatus 100.

When the acoustic device is driven as the microphone, the first and second selection parts 162 and 163 may connect the first electrode to the input terminal of the operational amplifier 164 and connect to the second electrode E2 to the ground terminal in response to the control signal CS.

A bias voltage Vbias is applied to the vibrator 10. The user's voice such as a sound wave may be provided to the acoustic device AD through the first opening part OP1 of the rear surface of the image display apparatus 100 and the second opening part OP2 of the front surface of the image display apparatus 100. That is, the sound wave may be transmitted to the acoustic device AD through the front and rear surfaces of the image display apparatus 100.

The sound wave provided to the acoustic device AD through the first opening part OP1 may be transmitted to the vibrator 10 of the acoustic device AD through the hole H of the display panel 110 and the first hole H1 of the first electrode E1. The sound wave provided to the acoustic device AD through the second opening part OP2 may be transmitted to the vibrator 10 of the acoustic device AD through the second hole H2 of the second electrode E2.

When the sound wave is transmitted to the vibrator 10, the vibrator 100 may be vibrated by the sound wave. The vibration of the vibrator 10 may cause a change in distance between the vibrator 10 and the first electrode E1. The vibrator and the first electrode E1 may be disposed to face each other with an air gap having an insulation property therebetween. A capacitance between the vibrator 10 and the first electrode E1 may change by the change in distance between the vibrator 10 and the electrode E.

Since the first electrode E1 is connected to the operational amplifier 164 having the relatively high input impedance, a small amount of charges existing in the first electrode E1 may move to the operational amplifier 164 regardless of the change in capacitance between the vibrator 10 and the first electrode E1. That is, a change in amount of changes existing in the vibrator 10 and the first electrode E1 may be ignored.

Since a small amount of charges existing in the first electrode E1 moves to the operational amplifier 164, the change in capacitance between the vibrator 10 and the first electrode E1 may be substantially converted into a change in potential of the first electrode E1 to output the charges through the operational amplifier 164. Thus, an electrical signal corresponding to the sound wave may be generated.

According to an embodiment of the inventive concept, the acoustic devices AD may be driven as the speaker and microphone according to positions thereof. Thus, even though the image display apparatus 100 is turned inside out, normal call may be enabled.

The acoustic signal generated in the acoustic devices AD may be discharged through the first and second opening parts OP1 and OP2 of the front and rear surfaces of the image display apparatus 100. Also, an external sound wave is provided to the acoustic devices AD through the first and second opening parts OP1 and OP2 of the front and rear surfaces of the image display apparatus 100. Thus, the user may make a call or hear music through the front and rear surfaces of the image display device 100.

As a result, the image display apparatus 100 according to an embodiment of the inventive concept may improve user's convenience.

Figure 4:
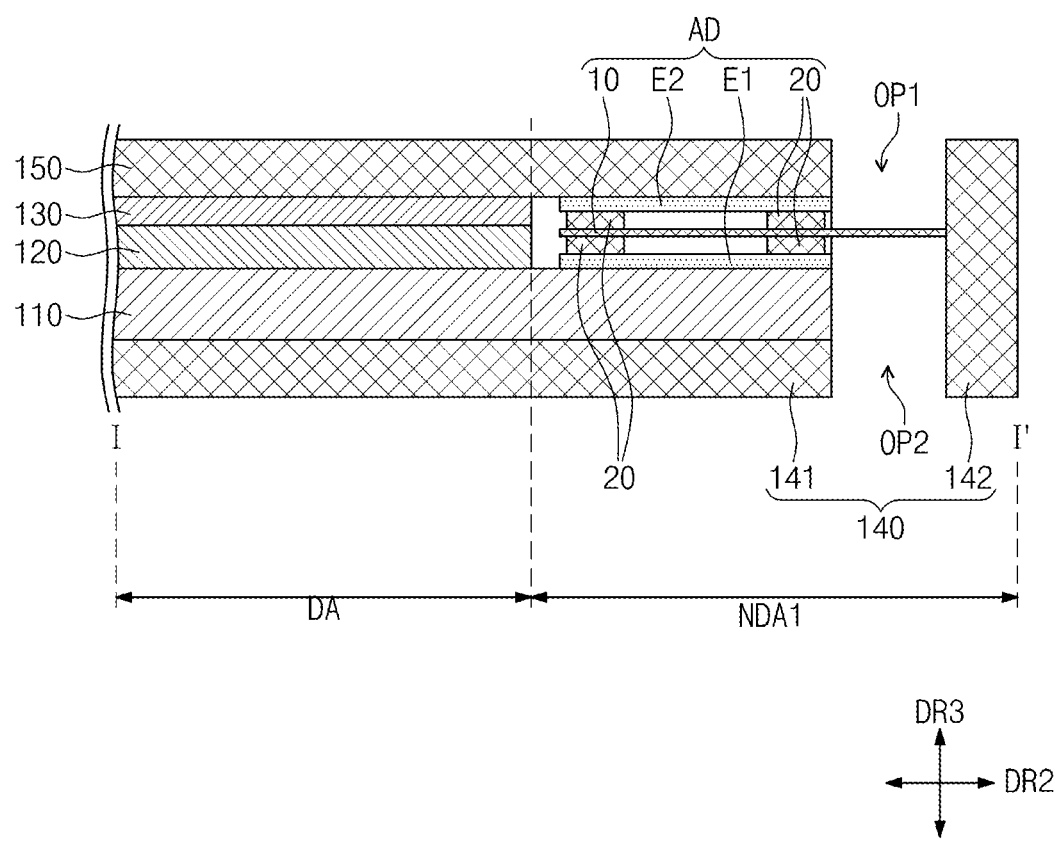
FIG. 4 is a cross-sectional view of an image display apparatus according to another embodiment of the inventive concept.

FIG. 4 is a cross-sectional view of an image display apparatus according to another embodiment of the inventive concept.

FIG. 4 illustrates a cross-sectional view corresponding to the line I-I' of FIG. 1. The image display apparatus of FIG. 4 has the same structure as the image display apparatus 100 of FIG. 2 except that a display panel 110 changes in length, and first and second electrodes E1 and E2 of an acoustic device AD changes in structure. Thus, structures different from those of the image display apparatus 100 of FIG. 2 will be described below.

Referring to FIG. 4, a display panel 110 is disposed adjacent to first and second opening parts OP1 and OP2 so that the display panel 110 does not overlap the first and second opening parts OP1 and OP2.

A length of a vibrator 10 in a second direction DR2 is greater than that of each of first and second electrodes E1 and E2. A predetermined area of the vibrator 10 adjacent to a side surface part 142 in the second direction DR2 may be disposed to overlap the first and second opening parts OP1 and OP2.

The first and second electrodes E1 and E2 are disposed adjacent to the first and second opening parts OP1 and OP2 in the second direction DR2 without overlapping the first and second opening parts OP1 and OP2.

The first and second electrodes E1 and E2 are disposed adjacent to the first and second opening parts OP1 and OP2 in the second direction DR2 without overlapping the first and second opening parts OP1 and OP2.

According to another embodiment, since other components of the image display apparatus are the substantially same as those of the image display apparatus 100 of FIG. 2, their detailed descriptions will be omitted.

According to another embodiment of the inventive concept, a sound generated in the acoustic devices AD is discharged through the first and second opening parts OP1 and OP2, and an external sound wave may be provided to the acoustic devices AD through the first and second opening parts OP1 and OP2.

As a result, the image display apparatus according to another embodiment of the inventive concept may improve user's convenience.

Figure 5:
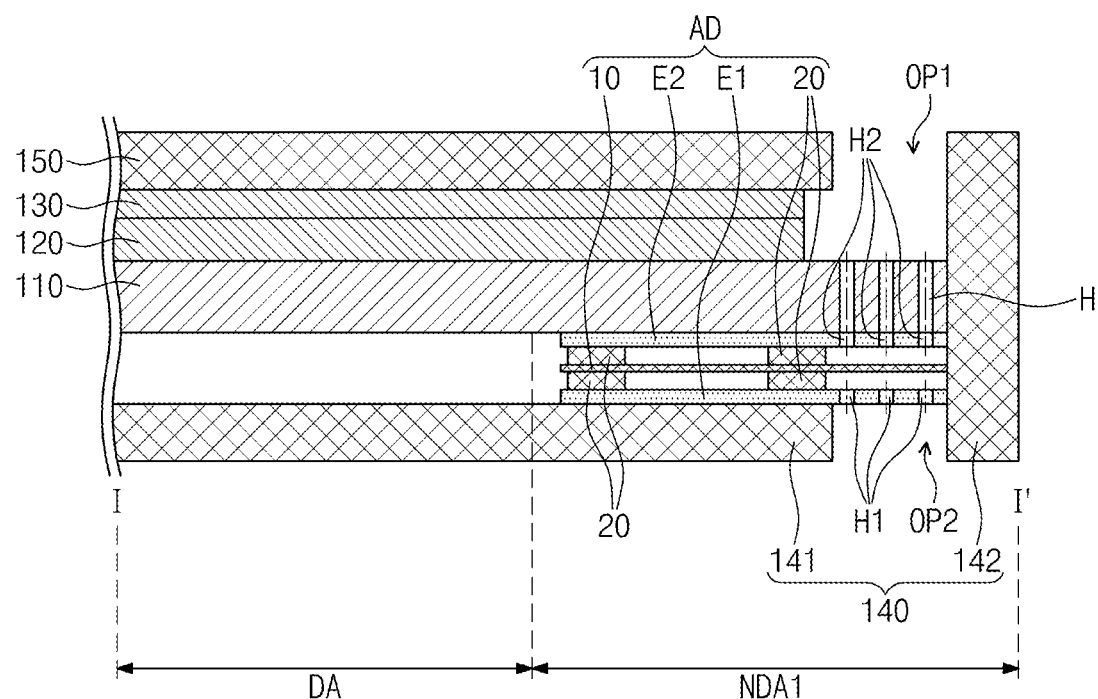
FIG. 5 is a cross-sectional view of an image display apparatus according to further another embodiment of the inventive concept.

FIG. 5 is a cross-sectional view of an image display apparatus according to further another embodiment of the inventive concept.

FIG. 5 illustrates a cross-sectional view corresponding to the line I-I' of FIG. 1. The image display apparatus of FIG. 5 has the same structure as the image display apparatus 100 of FIG. 2 except that each of an encapsulation layer 120 and polarization layer 130 changes in length, and the acoustic device AD changes in position. Thus, structures different from those of the image display apparatus 100 of FIG. 2 will be described below.

Referring to FIG. 5, the encapsulation layer 120 and the polarization layer 130 may extend up to a non-display area NDA and then disposed on a display panel 110.

The acoustic device AD is disposed under the display panel 110 of a first non-display area NDA1. That is, the acoustic devices AD is disposed under the display panel 110 of the first and second non-display areas NDA1 and NDA2.

Second electrodes E2 of the acoustic devices AD are disposed under the display panel 110 of the first and second non-display areas NAD1 and NAD2. First electrodes E1 of the acoustic devices AD are disposed on a bottom part 141 of a first protection member 140 of the first and second non-display areas NAD1 and NAD2.

According to further another embodiment, since other components of the image display apparatus are the substantially same as those of the image display apparatus 100 of FIG. 2, their detailed descriptions will be omitted.

According to further another embodiment of the inventive concept, an acoustic wave generated in the acoustic devices AD is discharged through the first and second opening parts OP1 and OP2, and an external sound wave may be provided to the acoustic devices AD through the first and second opening parts OP1 and OP2.

As a result, the image display apparatus according to further another embodiment of the inventive concept may improve user's convenience.

Figure 6:
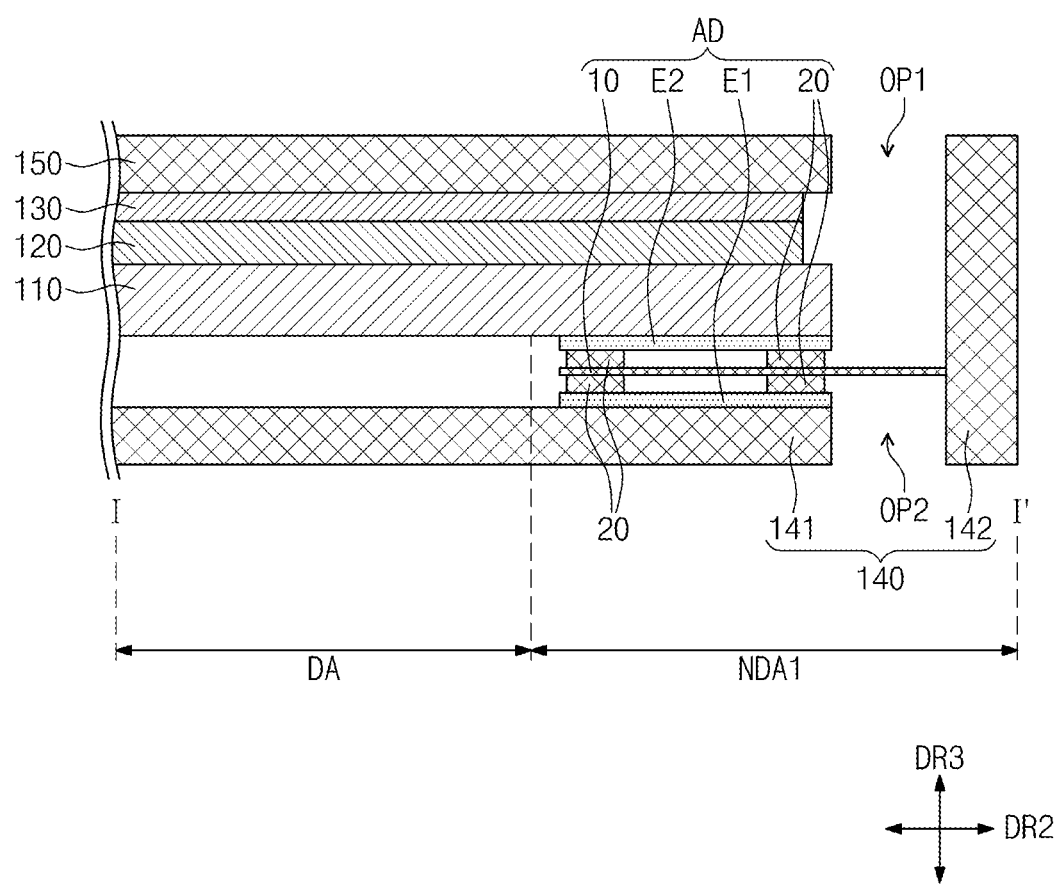
FIG. 6 is a cross-sectional view of an image display apparatus according to further another embodiment of the inventive concept.

FIG. 6 is a cross-sectional view of an image display apparatus according to further another embodiment of the inventive concept.

FIG. 6 illustrates a cross-sectional view corresponding to the line I-I' of FIG. 1. The image display apparatus of FIG. 6 has the same structure as the image display apparatus of FIG. 5 except that a display panel 110 changes in length, and first and second electrodes E1 and E2 of an acoustic device AD changes in structure. Thus, structures different from those of the image display apparatus of FIG. 5 will be described below.

Referring to FIG. 6, the display panel 110 extends adjacent to first and second opening parts OP1 and OP2. A length of a vibrator 10 in a second direction DR2 is greater than that of each of first and second electrodes E1 and E2. A predetermined area of the vibrator 10 adjacent to a side surface part 142 in the second direction DR2 may be disposed to overlap the first and second opening parts OP1 and OP2. The first and second electrodes E1 and E2 are disposed adjacent to the first and second opening parts OP1 and OP2 in the second direction DR2.

According to further another embodiment, since other components of the image display apparatus are the substantially same as those of the image display apparatus of FIG. 5, their detailed descriptions will be omitted.

According to further another embodiment of the inventive concept, an acoustic wave generated in the acoustic devices AD is discharged through the first and second opening parts OP1 and OP2, and an external sound wave may be provided to the acoustic devices AD through the first and second opening parts OP1 and OP2.

As a result, the image display apparatus according to further another embodiment of the inventive concept may improve user's convenience.

Figure 7:
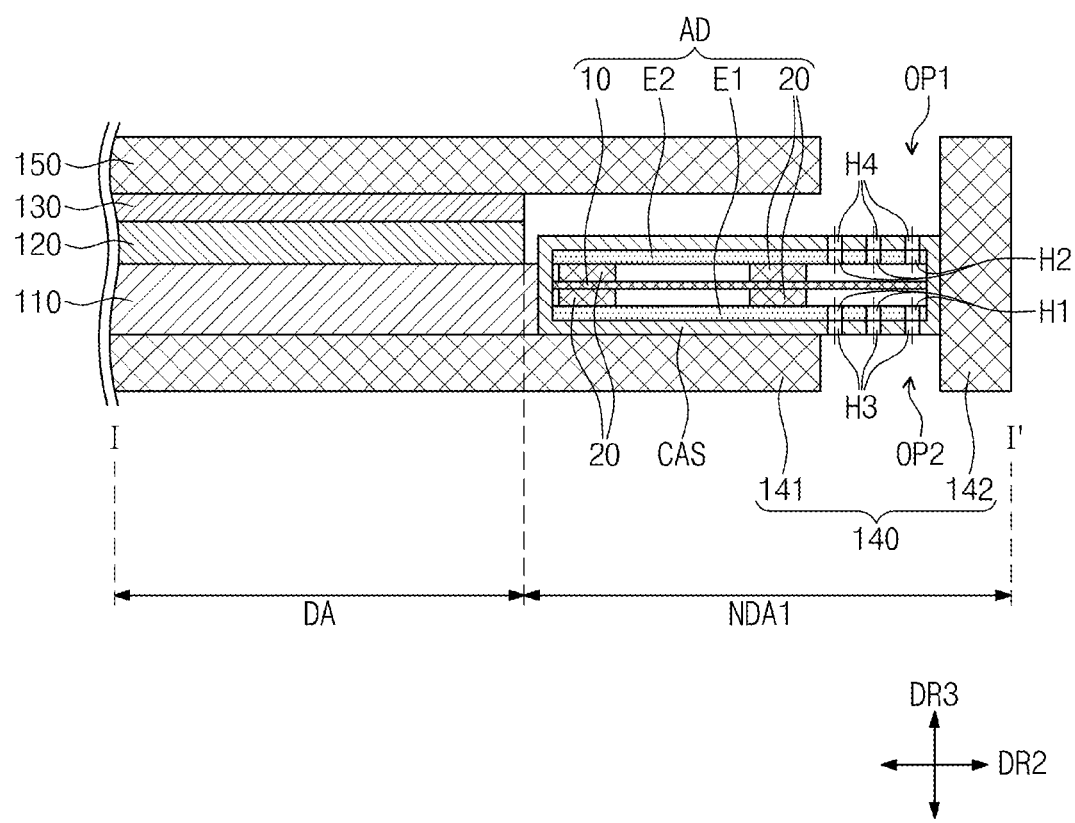
FIG. 7 is a cross-sectional view of an image display apparatus according to further another embodiment of the inventive concept.

FIG. 7 is a cross-sectional view of an image display apparatus according to further another embodiment of the inventive concept.

FIG. 7 illustrates a cross-sectional view corresponding to the line I-I' of FIG. 1. The image display apparatus of FIG. 7 has the same structure as the image display apparatus 100 of FIG. 2 except that a display panel 110 changes in length, and an acoustic device changes in structure. Thus, structures different from those of the image display apparatus 100 of FIG. 2 will be described below.

Referring to FIG. 7, the acoustic device AD is accommodated in a case CAS. The case CAS may fully cover the acoustic device AD. However, the case CAS may include an opening (not shown) having a predetermined size and for connecting a driving unit disposed on the display panel 110 thereto.

The case CAS includes a plurality of third holes H3 and fourth holes H4 defined in a predetermined area thereof adjacent to a side surface part 141.

The third holes H3 are adjacent to first holes H1 to overlap the first holes H1. The fourth holes H3 are adjacent to second holes H2 to overlap the second holes H2. Thus, a sound may be discharged to the outside through the third and fourth holes H3 and H4 of the case CAS, and an external sound wave may be transmitted to the acoustic device AD.

The case CAS accommodating the display panel 110 and the acoustic device AD is disposed on a bottom part 141 of a first protection member 140. The display panel 110 may extend up to a predetermined area of a first non-display area NDA1. The case CAS is disposed between a side surface of the display panel 110 and a side surface part 142 of a first protection member 140 on the first non-display area NDA1.

According to further another embodiment, since other components of the image display apparatus are the same as those of the image display apparatus 100 of FIG. 2, their detailed descriptions will be omitted.

According to further another embodiment of the inventive concept, an acoustic wave generated in the acoustic devices AD is discharged through the first and second opening parts OP1 and OP2, and an external sound wave may be provided to the acoustic devices AD through the first and second opening parts OP1 and OP2.

As a result, the image display apparatus according to further another embodiment of the inventive concept may improve user's convenience.

The image display apparatus according to the inventive concept can improve the user's convenience.

It will be apparent to those skilled in the art that various modifications and variations can be made in the inventive concept. Thus, it is intended that the present disclosure covers the modifications and variations of this invention provided they come within the scope of the appended claims and their equivalents. Thus, to the maximum extent allowed by law, the scope of the present invention is to be determined by the broadest permissible interpretation of the following claims and their equivalents, and shall not be restricted or limited by the foregoing detailed description.

What is claimed is:

1. An image display apparatus, comprising:
   a display panel displaying an image through a display area;
   a plurality of acoustic devices disposed on a non-display area around the display area;
   an encapsulation layer disposed on the display panel;
   a polarization layer disposed on the encapsulation layer;
   a protection member accommodating the display panel, the acoustic devices, the encapsulation layer, and the polarization layer; and
   a plurality of opening parts corresponding to the acoustic devices and exposing the acoustic devices to an outside, the plurality of opening parts opening the protection member of the non-display area in both directions perpendicular to a plane,
   wherein the acoustic devices are disposed between the encapsulation layer and a side surface of the protection member and between the polarization layer and the side surface of the protection member.

2. The image display apparatus of claim 1, wherein the acoustic devices are disposed on the display panel of the non-display area.

3. The image display apparatus of claim 1, wherein the acoustic devices are disposed on the display panel of first and second non-display areas, which are adjacent to both facing side surfaces of the display area, of the non-display area.

4. The image display apparatus of claim 3, wherein the protection member comprises:
   a first protection member comprising a bottom part and a side surface part extending upward from a boundary of the bottom part, the first protection member accommodating the display panel and the acoustic devices; and
   a second protection member disposed on the first protection member to cover the display panel and the acoustic devices.

5. The image display apparatus of claim 4, wherein the encapsulation layer and the polarization layer are accommodated in the first and second protection members, and the acoustic devices are disposed between the encapsulation layer and the side surface part and between the polarization layer and the side surface part.

6. The image display apparatus of claim 4, wherein each of the opening parts comprises:
   a first opening part defined in a predetermined area of the bottom part adjacent to the side surface part; and
   a second opening part defined in a predetermined area of the second protection member adjacent to the side surface part.

7. The image display apparatus of claim 4, wherein each of the acoustic devices has an area greater than that of each of the opening parts, and a predetermined area of each of the acoustic devices overlaps a corresponding opening part of the opening parts.

8. The image display apparatus of claim 4, wherein each of the acoustic devices comprises:
   a first electrode disposed on the display panel on the first and second non-display areas;
   a second electrode disposed to face the first electrode;
   a vibrator disposed between the first electrode and the second electrode, the vibrator having flexibility; and
   spacers disposed between the first electrode and the vibrator and between the second electrode and the vibrator.

9. The image display apparatus of claim 8, wherein the vibrator comprises:
   a film having flexibility; and
   a conductive layer disposed on each of both surfaces of the film.

10. The image display apparatus of claim 8, wherein the spacers are formed of an insulation material and have flexibility.

11. The image display apparatus of claim 8, wherein each of the first and second electrodes and the vibrator has an area greater than that of the corresponding opening part of the opening parts, and predetermined areas of the first and second electrodes adjacent to the side surface part and the vibrator overlap the corresponding opening part.

12. The image display apparatus of claim 8, wherein the display panel comprises a plurality of holes perpendicularly passing through the display panel on a predetermined area of the display panel, which is adjacent to the side surface part and overlaps the opening parts.

13. The image display apparatus of claim 12, wherein the first electrode comprises a plurality of first holes perpendicularly passing through the first electrode on a predetermined area of the first electrode overlapping a corresponding opening part of the opening parts, and
   the second electrode comprises a plurality of second holes perpendicularly passing through the second electrode on a predetermined area of the second electrode overlapping the corresponding opening part.

14. The image display apparatus of claim 13, wherein the holes, the first holes, and the second holes are aligned with each other on the opening parts.

15. The image display apparatus of claim 8, further comprising:
   an operational amplifier;
   an acoustic signal transmission part outputting voltages corresponding to an acoustic signal through an output terminal;
   a first selection part selectively connecting the output terminal of the acoustic signal transmission part and an input terminal of the operational amplifier to the first electrode in response to a control signal generated according to positions of the acoustic devices; and
   a second selection part selectively connecting the output terminal of the acoustic signal transmission part and a ground terminal to the second electrode in response to the control signal, wherein a bias voltage is applied to the vibrator, and voltages having polarities different from each other are respectively applied to the first and second electrodes.

16. The image display apparatus of claim 15, wherein the acoustic devices, which are closer to the ground, of the acoustic devices are driven as a microphone, and the acoustic devices, which are away from the ground, of the acoustic devices are driven as a speaker, when the acoustic devices are driven as the speaker, the first and second selection parts provide the voltages applied from the acoustic signal transmission part to the first and second electrodes in response to the control signal, and when the acoustic device are driven as the microphone, the first and second selection parts connect the first electrode to the input terminal of the operational amplifier and connect the second electrode to the ground terminal in response to the control signal.

17. The image display apparatus of claim 8, wherein the display panel extends to be adjacent to the opening parts, the first and second electrodes are disposed adjacent to the opening parts, and a predetermined area of the vibrator adjacent to the side surface part overlaps each of the opening parts.

18. The image display apparatus of claim 1, wherein the acoustic devices are disposed under the display panel on the first and second non-display areas, which are adjacent to both facing side surfaces of the display area, of the non-display area.

19. The image display apparatus of claim 1, further comprising a case accommodating the acoustic device, wherein the acoustic devices are disposed between a side surface of the display panel and an outer boundary of the protection member.

20. The image display apparatus of claim 19, wherein the case comprises a plurality of holes defined in a predetermined area of the case, which is adjacent to the outer boundary of the protection member.

* * * * *